US012118688B1

(12) United States Patent
Dean (10) Patent No.: US 12,118,688 B1
(45) Date of Patent: Oct. 15, 2024

(54) SYSTEMS AND METHODS FOR AUTOMATICALLY CORRECTING THE ORIENTATION OF THREE-DIMENSIONAL MODELS

(71) Applicant: Illuscio, Inc., Culver City, CA (US)

(72) Inventor: Kevin Edward Dean, Greenwood, IN (US)

( * ) Notice: Subject to any disclaimer, the term of this patent is extended or adjusted under 35 U.S.C. 154(b) by 0 days.

(21) Appl. No.: 18/529,099

(22) Filed: Dec. 5, 2023

(51) Int. Cl.
*G06T 19/20* (2011.01)
*G06V 10/764* (2022.01)

(52) U.S. Cl.
CPC .......... *G06T 19/20* (2013.01); *G06V 10/764* (2022.01)

(58) Field of Classification Search
None
See application file for complete search history.

(56) References Cited

U.S. PATENT DOCUMENTS

2010/0278431 A1* 11/2010 Mathe ................. H04N 23/611 382/289
2018/0322357 A1* 11/2018 Chen ................... G06F 18/2148

OTHER PUBLICATIONS

Seong-heum Kim, Yu-Wing Tai, Joon-Young Lee, Jaesik Park, In So Kweon, "Category-Specific Salient View Selection via Deep Convolutional Neural Networks", Feb. 15, 2017, Wiley, Computer Graphics Forum, vol. 36, No. 8, pp. 313-328.*
Ching-Chang Wong, Li-Yu Yeh, Chih-Cheng Liu, Chi-Yi Tsai, Hisasuki Aoyama, "Manipulation Planning for Object Re-Orientation Based on Semantic Segmentation Keypoint Detection", Mar. 24, 2021, MDPI, Sensors, vol. 21, article 2280.*
Hongbo Fu, Daniel Cohen-Or, Gideon Dror, Alla Sheffer, "Upright Orientation of Man-Made Objects", Aug. 2008, ACM, SIGGRAPH '08: ACM SIGGRAPH 2008 papers, Article No. 42, pp. 1-7.*
Xufang Pang, Feng Li, Ning Ding, B Xiaopin Zhong, "Upright-Net: Learning Upright Orientation for 3D Point Cloud", Jun. 24, 2022, IEEE, 2022 IEEE/CVF Conference on Computer Vision and Pattern Recognition (CVPR), pp. 14891-14899.*
Seong-heum Kim, Yu-Wing Tai, Joon-Young Lee, Jaesik Park, In So Kweon, "Category-Specific Salient View Selection via Deep Convolutional Neural Networks", Feb. 15, 2017, Eurographics Association, Computer Graphics Forum, vol. 36, Issue 8, pp. 313-328.*

* cited by examiner

*Primary Examiner* — Robert Bader
(74) *Attorney, Agent, or Firm* — Ansari Katiraei LLP; Arman Katiraei; Sadiq Ansari (57) ABSTRACT

A three-dimensional (3D) graphics system automatically corrects the orientation of different 3D models based on a classification of the objects represented by each 3D model. The 3D graphics system receives a 3D model that is defined with multiple primitives distributed in a 3D space. The 3D graphics system determines a classification based on the primitives having a unique pattern, commonality, or feature that differentiates a particular object from other objects. The 3D graphics system maps points-of-reference that are associated with the classification to two or more primitives in the 3D space of the 3D model, generates an orientation vector based on the points-of-reference, and adjusts an orientation with which the 3D model is presented based on the orientation vector.

18 Claims, 7 Drawing Sheets

SYSTEMS AND METHODS FOR AUTOMATICALLY CORRECTING THE ORIENTATION OF THREE-DIMENSIONAL MODELS

BACKGROUND

Three-dimensional (3D) models may be generated from scanning or imaging physical objects or environments, and defining primitives in a 3D space to match the positioning and visual characteristics of the scanned or imaged physical objects or environments. However, if the physical objects or environments are scanned or imaged at an angle or with an offset, the resulting 3D model may be incorrectly titled, rotated, or oriented at the angle or with the offset. For instance, if the scanning is performed from an uneven ground surface, the 3D model may be generated and presented with an orientation that is offset from a correct or proper vertical orientation.

Some 3D models may be generated and/or defined without a default orientation. The application that reads, renders, and/or otherwise presents the 3D models has no point-of-reference against which to orient the 3D models, and may therefore incorrectly or inconsistently present the 3D models with orientations, rotations, tilts, and/or other positional offsets that cause the 3D models to appear off-center, askew, and/or different from an expected or normal presentation.

Moreover, some applications may present the 3D models according to different axes or coordinate systems. Accordingly, even if a default orientation is defined for a 3D model, the different applications may map the default orientation differently causing the different applications to inconsistently present the 3D model with different tilts, orientations, and/or other positional offsets.

DETAILED DESCRIPTION OF PREFERRED EMBODIMENTS

The following detailed description refers to the accompanying drawings. The same reference numbers in different drawings may identify the same or similar elements.

Provided are systems and associated methods for automatically correcting the orientation of three-dimensional (3D) models. The systems and methods generate one or more orientation vectors within the 3D model definition or encoding, and the one or more orientation vectors may be used to consistently present the 3D model with a correct orientation about one or more axis that the one or more orientation vectors are defined against.

In some embodiments, a 3D graphics system may use artificial intelligence and/or machine learning (AI/ML) techniques to classify the object or scene represented by a 3D model, and to determine at least two orientation points-of-reference for a correct orientation of the representation object or scene about at least one axis based on the classification. The AI/ML techniques may associate the at least two orientation points-of-reference to each object or scene classification based on training data that identifies the classified objects or scenes with a correct orientation. The 3D graphics system may generate one or more orientation vectors within a 3D model using the at least orientation points-of-reference, and/or may correct the orientation of the 3D model by aligning the one or more orientation vectors to one or more axes of the coordinate system in which the 3D model is rendered.

Figure 1:
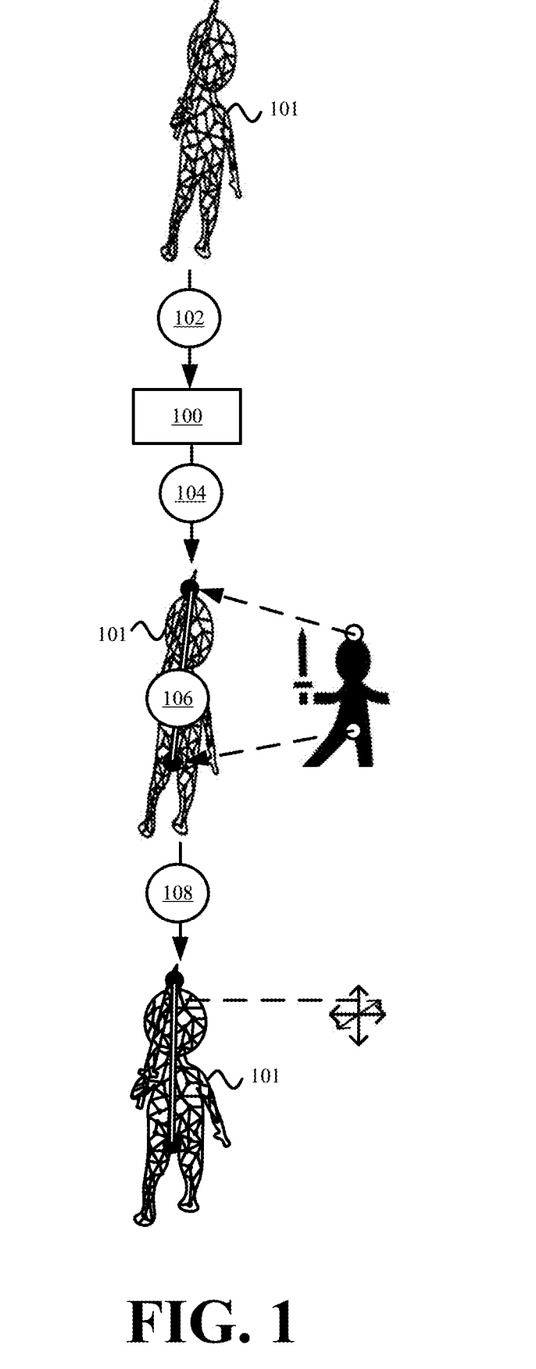
FIG. 1 illustrates an example of the automatic orientation correction that is performed in accordance with some embodiments presented herein.

FIG. 1 illustrates an example of the automatic orientation correction that is performed in accordance with some embodiments presented herein. 3D graphics system 100 may generate or receive (at 102) 3D model 101. 3D model 101 may be presented with an incorrect orientation because of how it was captured or defined, a lack of a vector or other value for defining a default orientation of the represented object, and/or a mapping of the primitives defined for 3D model 101 to a coordinate space or virtual space of 3D graphics system 100 or another viewing application.

3D model 101 is defined with primitives that are distributed in a 3D space to form a 3D shape of a represented object or scene. Each primitive is defined with one or more coordinates or positional elements that define that primitive's position or location in the 3D space. Each primitive is also defined with visual characteristics or non-positional elements that represent the colors, transparency, reflectiveness, and/or properties of the surface or feature represented by the primitive.

In some embodiments, the primitives of 3D model 101 include meshes or polygons that are connected to one another in order form the 3D shape of the represented object or scene. In some such embodiments, 3D model 101 is a mesh model.

In some other embodiments, the primitives of 3D model 101 include points of a point cloud. In some such embodiments, the 3D shape and visual characteristics of the represented object or scene are formed by a disconnected distribution of points in the 3D space of 3D model 101.

3D model 101 may also be defined with other types of primitives of other 3D formats. In any case, the primitives have positions defined in a 3D space in order to recreate the shape and form of any 3D object or scene whether real or digitally created.

3D graphics system 100 determines (at 104) the top and bottom points-of-reference for correcting a vertical or y-axis orientation of the object or scene represented in 3D model 101. In some embodiments, 3D graphics system 100 also determines the left and right points-of-reference for correcting a horizontal or x-axis orientation of the object or scene, and front and back points-of-reference for correcting a forward or z-axis orientation of the object or scene.

3D graphics system 100 may determine (at 104) the top and bottom points-of-reference by classifying the object or scene that is represented by the primitives of 3D model 101, by determining the correct orientation of the classified object or scene from a training set of images or models of the object or scene, and by matching points-of-reference from the training of set of images or models to primitives of 3D model 101. 3D graphics system 100 defines (at 106) an orientation vectors based on the determined (at 104) top and bottom points-of-reference.

3D graphics system 100 corrects (at 108) the orientation of 3D model 101 based on the defined (at 106) orientation vector. 3D graphics system 100 corrects (at 108) the orientation of 3D model 101 by rotating, tilting, and/or otherwise adjusting the positioning of 3D model 101 until the orientation vector has a 90 degree angle or the orientation vector is aligned with the y-axis of the coordinate system in which 3D model 101 is being rendered.

Other applications that access 3D model 101 may render the primitives of 3D model 101 at positions that are defined for those primitives in a 3D coordinate system of the application, and the orientation of the generated 3D object may be corrected by rotating or otherwise adjusting the 3D coordinate system or the generated 3D object until the orientation vector is vertical. The generated 3D object may then be presented with the correct orientation on a display.

Figure 2:
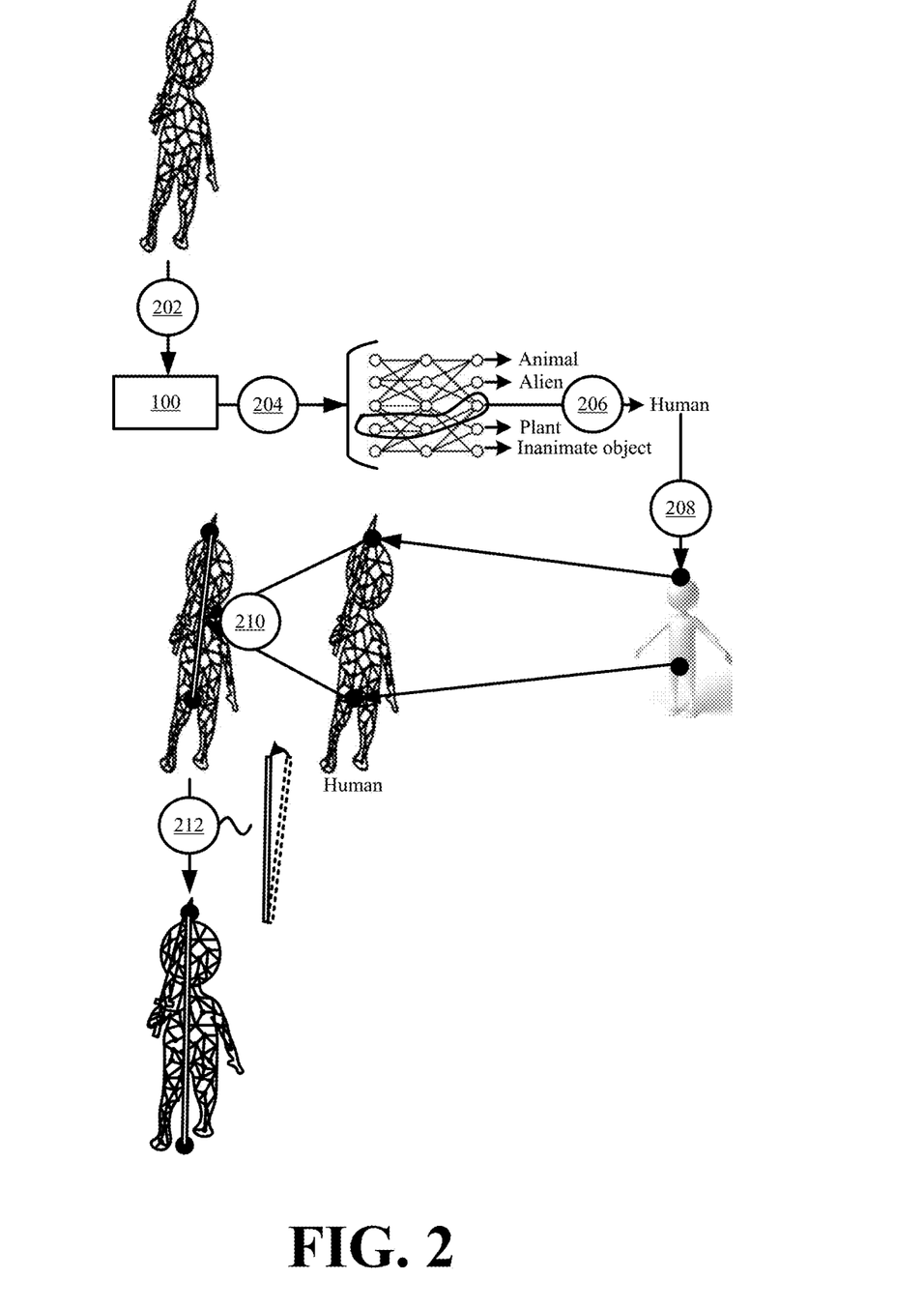
FIG. 2 illustrates an example of defining the orientation correcting vector for a three-dimensional (3D) model in accordance with some embodiments presented herein.

FIG. 2 illustrates an example of defining the orientation correcting vector for a 3D model in accordance with some embodiments presented herein. 3D graphics system 100 receives (at 202) a 3D model with primitives distributed in a 3D space to form the shape, form, and look of one or more objects and/or scene.

3D graphics system 100 enters (at 204) the primitives or a sampling of the primitives into a 3D classification model. The 3D classification model is trained to recognize unique patterns, commonality, or other differentiating features of different objects or scenes, and to classify the represented objects or scenes with a descriptive label or tag. For instance, the 3D classification model may include a neural network that is provided different labeled 3D models as training data. The labeled 3D models are labeled with an identifier for the object or scene that is represented in each 3D model. The neural network analyzes the positioning and coloring of different subsets of primitives within the 3D models having the same classification in order to determine repeating patterns or common subsets of primitives that are present in each of the commonly classified 3D models. The neural network may then compare the patterns, commonality, and/or differentiating features that were detected in the models or images having different classifications in order to determine which patterns, commonality, or features uniquely identify and differentiate one object or scene with a particular classification from other objects or scenes with other classifications. For instance, a vehicle wheel and a clock may both a circular or round shapes. The neural network determines that the round shape is not a unique pattern, commonality, or feature of either object. Instead, the neural network defines the unique or differentiating features of the vehicle wheel based on grooves about the outer edge of the circular shape and various patterns for the hub at the center of the wheel, and defines the unique or differentiating features of the clock based on a long and a short hand extending from the center of the round shape. In some embodiments, the neural network defines the 3D classification model with vectors that correspond to the one or more unique patterns, commonality, and/or differentiating features that were detected for each object and associated classification or identifier, defines each vector with the associated classification or identifier for the object or scene represented by the unique pattern, commonality, and/or differentiating features of that vector.

3D graphics system 100 uses the 3D classification model to detect and classify (at 206) the object or scene that is represented by the primitives of the received 3D model. Specifically, the 3D classification model samples different primitives from the 3D model to determine if the sampled primitives match the patterns, commonality, and/or differentiating features represented by any of the 3D classification model vectors.

In some embodiments, the 3D classification model renders the sampled set of primitives to generate a 3D visualization, and the 3D visualization is compared against visualizations of different unique shapes, visual characteristics, and/or other features represented by the vectors of the 3D classification model. In some embodiments, the 3D classification model directly compares the defined positional values and/or visual characteristics of the sampled set of primitives against recorded values stored in the vectors of the 3D classification model to determine if the defined positional values and/or visual characteristics match the unique differentiating patterns or commonality of a particular classification.

In response to detecting a match, the 3D classification model assigns a classification label, tag, or other identifier to the 3D model. The identifier indicates what object or scene is detected within the 3D model by the 3D classification model.

Each classification or vector of the 3D classification model may be associated with a specific orientation for the object or scene represented by that classification or vector. The associated orientation may be defined with at least two points-of-reference for the top and bottom of the classified object or scene. In other words, each classification or vector in the 3D classification model may be associated with an identifier for a detected object or scene and positions for the points-of-reference for correctly orienting that detected object or scene. For instance, the classification for a human or humanoid character may be associated with an orientation that is based on a first point-of-reference positioned atop the human head and a second point-of-reference that is positioned at the bottom of the human torso, whereas the classification for a clock may be associated with an orientation that is based on a first point-of-reference positioned at the 12 hour marker and a second point-of-reference positioned at the 6 hour marker.

3D graphics system 100 defines (at 208) the points-of-reference for the received 3D model based on the specific orientation that is associated with the vector from the 3D classification model for the classified object or scene detected in the received 3D model. Defining (at 208) the points-of-reference may include mapping the points-of-reference from specific features or positions of the classified object or scene to corresponding features or positions in the received 3D model. In some embodiments, 3D graphics system 100 defines (at 208) the points-of-reference as new primitives in the 3D model that are invisible and that do not affect the rendered visualization of the 3D model. For instance, the new primitives are positioned at the identified top of the human head and the bottom of the human torso.

In some embodiments, the points-of-reference may be defined (at 208) and/or used to orient the represented object or scene about other axes (e.g., x-axis or z-axis). In some such embodiments, the points-of-reference may be defined to identify the leftmost and rightmost positions about a centerline of the represented object or scene, or the front and back at the center of the represented object or scene.

3D graphics system 100 generates (at 210) an orientation vector based on the points-of-reference. The orientation vector may include a line that connects the points-of-reference.

3D graphics system 100 or another 3D model viewing application may correctly orient (at 212) the represented object or scene using the orientation vector. To vertically orient (at 212) the 3D model based on the orientation vector, 3D graphics system 100 or another 3D model viewing application may rotate, tilt, or otherwise adjust the positioning of 3D model primitives until the orientation vector is perfectly vertical and/or is aligned with the y-axis of the coordinate space in which the 3D model is mapped and presented.

Figure 3:
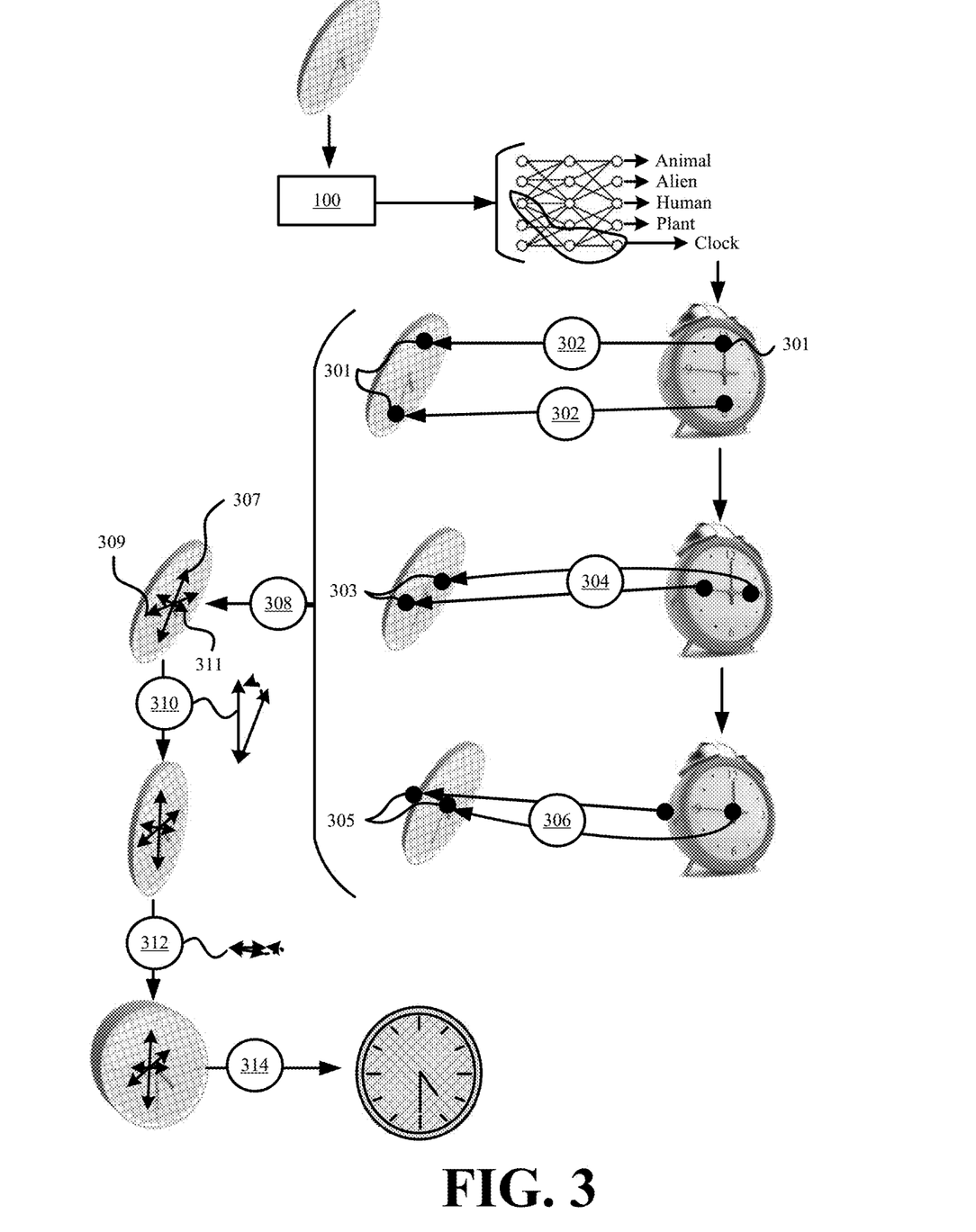
FIG. 3 illustrates an example of correcting the orientation of a 3D model about multiple axes in accordance with some embodiments presented herein.

FIG. 3 illustrates an example of correcting the orientation of a 3D model about multiple axes in accordance with some embodiments presented herein. 3D graphics system 100 defines (at 302) first points-of-reference 301 for correcting a vertical orientation of the 3D model, defines (at 304) second points-of-reference 303 for correcting a horizontal orientation of the 3D model, and defines (at 306) third points-of-reference 305 for correcting a directional orientation of the 3D model based on a classification of the object represented by the 3D model and a mapping of points-of-reference from features of the classified object to the primitives of the 3D model that represent those same features in the 3D model.

3D graphics system 100 generates (at 308) first orientation vector 307 based on first points-of-reference 301, second orientation vector 309 based on second points-of-reference 303, and third orientation vector 311 based on third points-of-reference 305. First orientation vector 307 may be generated (at 308) by referencing a first pair or existing or newly generated and invisible primitives of the 3D model that correspond to first points-of-reference 301, second orientation vector 309 be generated (at 308) by referencing a second pair or existing or newly generated and invisible primitives of the 3D model that correspond to second points-of-reference 303, and third orientation vector 311 be generated (at 308) by referencing a third pair or existing or newly generated and invisible primitives of the 3D model that correspond to third points-of-reference 305.

3D graphics system 100 performs (at 310) a first orientation correction of the 3D model based on first orientation vector 307. The first orientation correction involves rotating, tilting, or otherwise adjusting the orientation of the 3D model about a first axis (e.g., the y-axis) until first orientation vector 307 is vertical (e.g., at a 90 degree angle) in the coordinate space in which the 3D model is presented or is aligned with the first axis of the coordinate system.

3D graphics system 100 performs (at 312) a second orientation correction of the 3D model based on second orientation vector 309. The second orientation correction involves rotating, tilting, or otherwise adjusting the orientation of the 3D model about a second axis (e.g., the x-axis) until second orientation vector 309 is horizontal or flat (e.g., at a 0 degree angle) in the coordinate space in which the 3D model is presented or is aligned with the second axis of the coordinate system.

3D graphics system 100 performs (at 314) a third orientation correction of the 3D model based on third orientation vector 311. The third orientation correction involves rotating, tilting, or otherwise adjusting the orientation of the 3D model about a third axis (e.g., the z-axis) until third orientation vector 311 is directed in the direction of the render position such that the points-of-reference for the front and back of the 3D model are facing directly towards and away from the display and/or with the third vector being aligned perpendicular to the first and second vectors.

In this manner, 3D graphics system 100 automatically corrects the orientation of the 3D model without any human intervention or manual input. Moreover, other applications may reference the generated vectors to correctly orient the 3D model even the applications use different coordinate systems.

Figure 4:
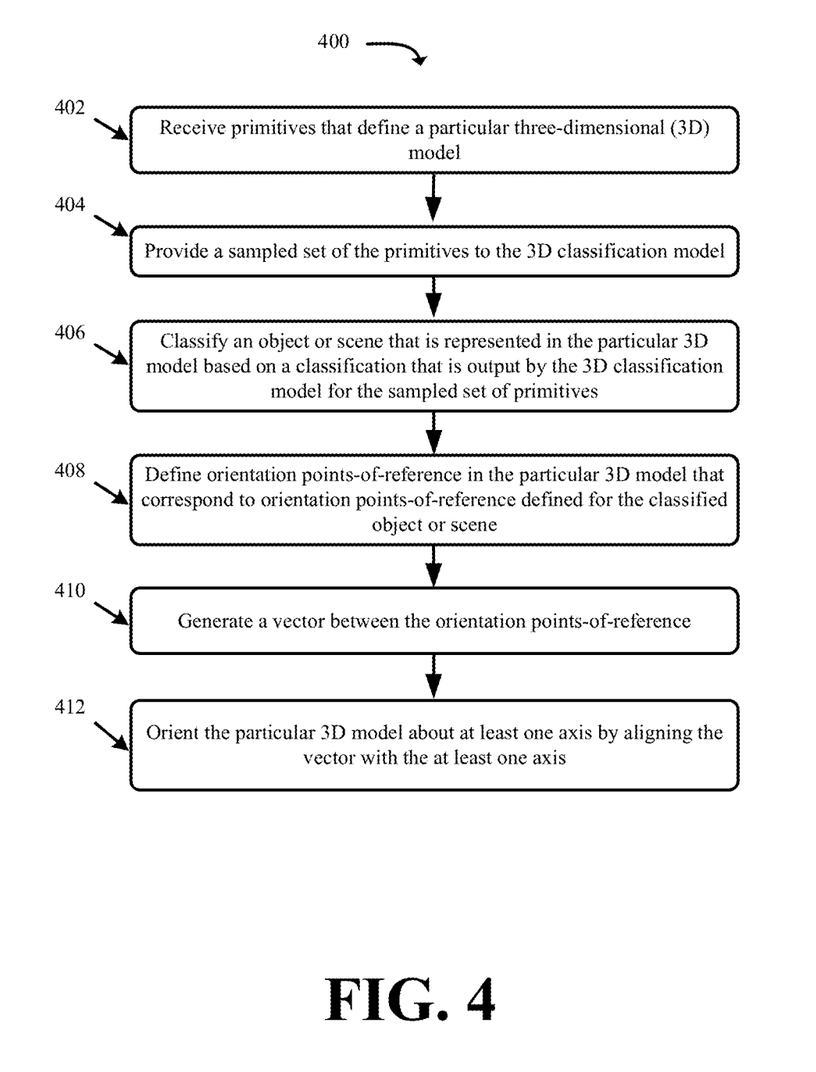
FIG. 4 presents a process for automatically orientating a 3D model in accordance with some embodiments presented herein.

FIG. 4 presents a process 400 for automatically orientating a 3D model in accordance with some embodiments presented herein. Process 400 is implemented by 3D graphics system 100. 3D graphics system 100 may include one or more devices or machines with processor, memory, storage, network, and/or other hardware resources used for the creation, editing, processing, presentation, and/or interaction of different 3D models.

Process 400 includes receiving (at 402) primitives that define a particular 3D model. In some embodiments, 3D graphics system 100 receives (at 402) a file that encodes the primitives of the particular 3D model. In some other embodiments, 3D graphics system 100 receives (at 402) the primitives as they are generated from scanning or imaging a physical object or scene. The primitives correspond to meshes, polygons, or points that are defined with a 3D position (e.g., x, y, and z coordinates) and with color values (e.g., red, green, and blue values) and other visual characteristics for that 3D position.

Process 400 includes providing (at 404) a sampled set of the primitives to the 3D classification model. In some embodiments, the sampled set of the primitives includes less than all of the primitives defined in the particular 3D model. The sampling reduces the processing effort and the number of primitives that are analyzed by the 3D classification model in order to recognize and classify the represented object or scene. In some embodiments, the sampled set of primitives may include a sampling of primitives from the entirety of the particular 3D model. For instance, 3D graphics system 100 may provide (at 404) every third primitive that is defined in the particular 3D model such that the object or scene classification is performed using 33% of the particular 3D model primitives. In some other embodiments, the sampled set of primitives may include primitives from a particular region of interest in the particular 3D model. For instance, the particular region of interest may include a region that includes a higher density of primitives than other regions and a greater variety in the positioning or visual characteristics than other regions.

Process 400 includes classifying (at 406) an object or scene that is represented in the particular 3D model based on a classification that is output by the 3D classification model for the sampled set of primitives. Specifically, the 3D classification model determines that the sampled set of primitives match the unique positional and/or visual characteristic pattern, commonality, or differentiating feature defined for a particular vector of the 3D classification model, wherein the particular vector represents the unique pattern, commonality, or differentiating feature for detecting a particular object or scene from other objects or scenes that the 3D classification model is trained to identify.

Process 400 includes defining (at 408) orientation points-of-reference in the particular 3D model that correspond to orientation points-of-reference defined for the classified object or scene. For instance, the orientation points-of-reference may be defined by mapping specific primitives, positions, or features from the classified object or scene onto corresponding primitives, positions, or features of the particular 3D model. The orientation points-of-reference may include new primitives or points that are added to the particular 3D model without altering the visualization that is generated from rendering the existing primitives of the particular 3D model. In some embodiments, existing primitives of the particular 3D model may be selected and tagged to serve as the orientation points-of-reference. For instance, the 3D classification model may specify a first orientation point-of-reference at a first feature that represents the 12 hour marker of a clock, and 3D graphics system 100 may identify the one or more primitives representing the 12 hour marker in the 3D model and may place or define the first orientation point-of-reference at the positions spanned by the one or more primitives. In any case, the orientation points-of-reference are identified with one or more identifiers or tags that are added to the metadata or definition of the primitives that represent the orientation points-of-reference in the received 3D model.

Process 400 includes generating (at 410) a vector between the orientation points-of-reference. For instance, the orientation points-of-reference may serve as the endpoints for the vector.

Process 400 include orientating (at 412) the particular 3D model about at least one axis by aligning the vector with the at least one axis. For a correct vertical orientation of the particular 3D model, 3D graphics system 100 may rotate the particular 3D model until the vector defined based on top and bottom orientation points-of-reference is aligned with the y-axis of the 3D space in which the particular 3D model is rendered or presented or the vector has a 90 degree angle. For a correct horizontal orientation of the particular 3D model, 3D graphics system 100 may rotate the particular 3D model until the vector defined based on left and right orientation points-of-reference is aligned with the x-axis of the 3D space in which the particular 3D model is rendered or presented or the vector has a 0 degree angle.

In some embodiments, orientating (at 412) the particular 3D model includes scanning the particular 3D model for one or more generated (at 410) vectors. The vectors may be differentiated from the primitives of the particular 3D model as they may be defined with one or more positions and a directional vector rather than color values or visual characteristics. In some embodiments, the vectors may be stored in the metadata of the particular 3D model. In some other embodiments, the vectors may be stored as part of the primitive definition or encoding, and may be differentiated from the primitives based on their definition or with tags.

3D graphics system 100 may use existing 3D transform tools to perform the orientation corrections associated with each generated orientation vector. Each orientation correction involves selecting all primitives of the 3D model and adjusting the positional coordinates of the primitives about an axis to achieve the desired rotation, tile, or adjustment along that axis.

In some embodiments, 3D graphics system 100 defines different orientation vectors for correcting the orientation of different objects or object components that are detected in the same 3D model relative to the same axis. The different orientation vectors may be used to adjust the orientation of the 3D model to present each of the different objects or object components clearly without obstruction and/or at the center of the display when a user interacts with each object or object components.

To define the different orientation vectors, 3D graphics system 100 may deconstruct a 3D model into different sets of primitives that correspond to the different objects or object components that are detected in the same 3D model, may associate different points-of-orientation for the object or component represented by each set of primitives, and may define the different orientation vectors for each set of primitives based on the associated points-of-orientation.

Figure 5:
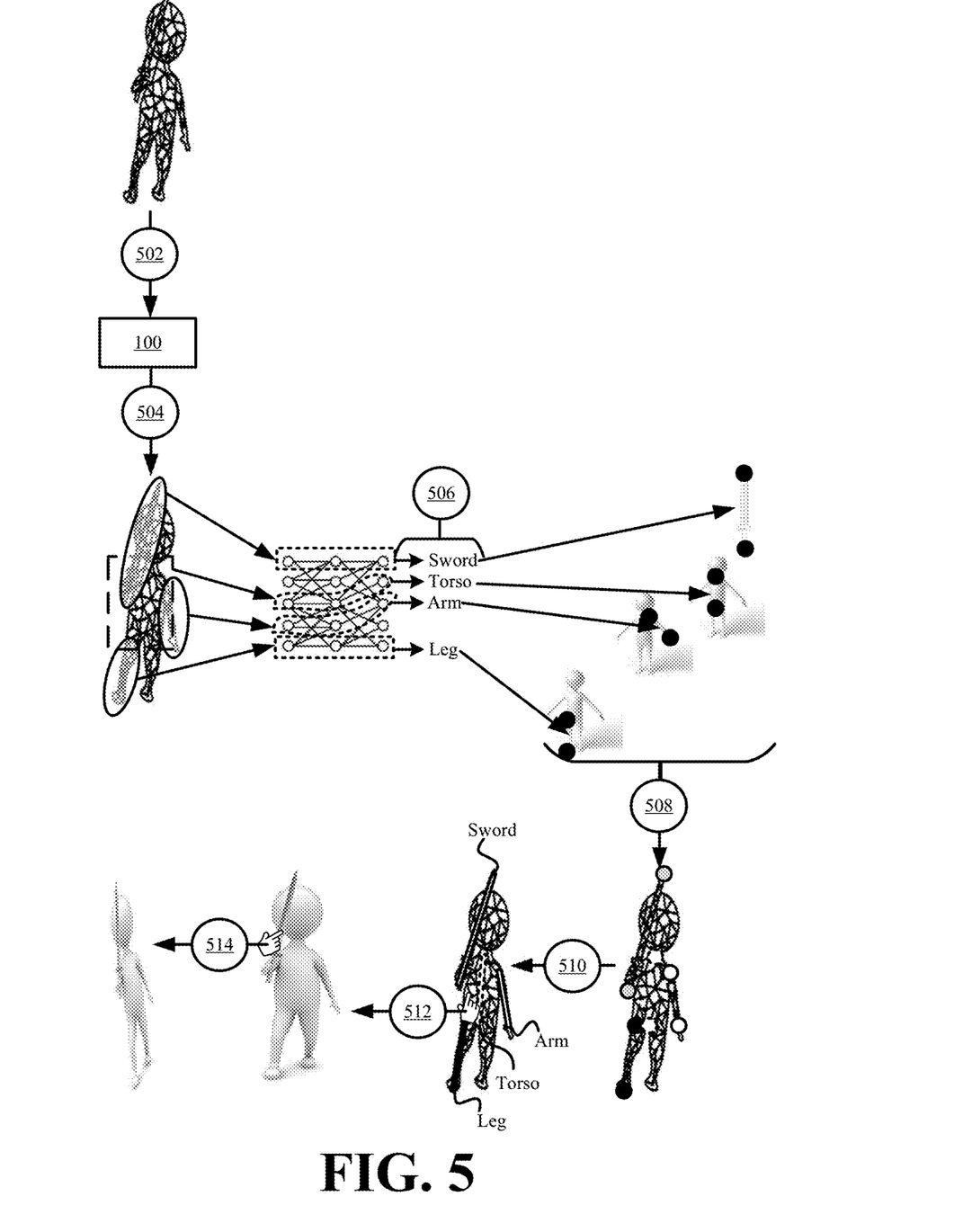
FIG. 5 illustrates an example of orientating different components of an object based on orientation vectors that are associated with each object component in accordance with some embodiments presented herein.

FIG. 5 illustrates an example of orientating different components of an object based on orientation vectors that are associated with each object component in accordance with some embodiments presented herein. 3D graphics system 100 receives (at 502) a 3D model representing a complex object with different components.

3D graphics system 100 enters (at 504) the 3D model or different sets of primitives of the 3D model into the 3D classification model, and the 3D classification model outputs (at 506) different classifications for the different recognized components within the 3D model. For instance, the 3D model may be of a digitally created character. Rather than provide a single classification for the entirely of the character, the 3D classification model may detect the unique patterns, commonality, or features that differentiate the set of primitives of the character torso from the sets of primitives of the character's arms and legs, and that differentiate a sword held by the character from other components. Outputting (at 506) the different classifications may include assigning a different identifier to the set of primitives for each recognized character component.

Each recognized component may be associated with different points-of-orientation in the 3D classification model. Accordingly, 3D graphics system 100 may apply (at 508) the points-of-orientation that are defined for a particular character component to the set of primitives that were determined to represent or recreate that particular character component in the 3D model. Applying (at 508) the points-of-orientation for the particular character component may include defining new primitives in the 3D model or selecting existing primitives at locations or positions that represent unique features where the points-of-reference are associated with the particular character components, and associating the points-of-orientation to the new or selected primitives. For instance, the 3D classification model may differentiate between a first set of primitives that represent the character torso from a second set of primitives that represent the character arm. 3D graphics system 100 may tag the first set of primitives with a first identifier that identifies the character torso, may select a first primitive from the first set of primitives at the top of the torso or where the neck connects to the torso as a first point-of-reference for correcting an orientation of the torso, and may select a second primitive from the first set of primitives at the bottom of the torso or where the legs connects to the toro as a second point-of-reference for correcting the orientation of the torso. Similarly, 3D graphics system 100 may tag the second set of primitives with a second identifier that identifies the character arm, may select a first primitive from the second set of primitives that represents the shoulder top as a first point-of-reference for correcting an orientation of the arm, and may select a second primitive from the second set of primitives that represents the wrist as a second point-of-reference for correcting the orientation of the arm.

3D graphics system 100 may generate (at 510) a different orientation vector for each detected object component based on the points-of-reference identified for that object component, and may associate the orientation vector to the set of primitives that represent that object component. For instance, each orientation vector may be tagged with the same identifier as the identifier that is associated with and that classifies the set of primitives as a particular object component. A first orientation vector generated (at 510) for the set of primitives representing the sword may be used to perform a first orientation correction that orients the 3D model to present the sword at the center, frontmost, and/or with a vertical or other specific orientation, and a second orientation vector generated (at 510) for the set of primitives representing the arm may be used to perform a second orientation correction that orients the 3D model to present the arm at the center, frontmost, and/or with a vertical or other specific orientation.

3D graphics system 100 may monitor for user input. The user input may include keyboard inputs, mouse inputs, touch inputs, and/or inputs from other input devices or may include programmatic inputs.

In response to detecting a user input that implicates one or more primitives that form the character torso, 3D graphics system 100 may change (at 512) the orientation of the 3D model according to an orientation vector that is generated (at 510) from the points-of-orientation defined for the character torso. For instance, 3D graphics system 100 rotates the 3D model until the character torso is front facing and tilted in a vertical or upright position.

In response to detecting a user input that implicates one or more primitives that form the sword, 3D graphics system 100 may change (at 514) the orientation of the 3D model according to an orientation vector that is generated (at 510) from the points-of-orientation defined for the sword. For instance, 3D graphics system 100 rotates the 3D model to present the sword in a frontmost and vertical position that causes the character holding the sword to appear in an offset or tilted orientation.

The automatic orientation to differentiated objects or components within the same 3D model simplifies user interactions with that 3D model. Rather than manually adjusting the orientation of the 3D model to expose or reveal the primitives of a desired component, 3D graphics system 100 allows the user to interact directly with one or more primitives of the desired component, and 3D graphics system 100 automatically rotates and/or changes the orientation of the 3D model to present the desired component at a predefined optimal orientation.

Figure 6:
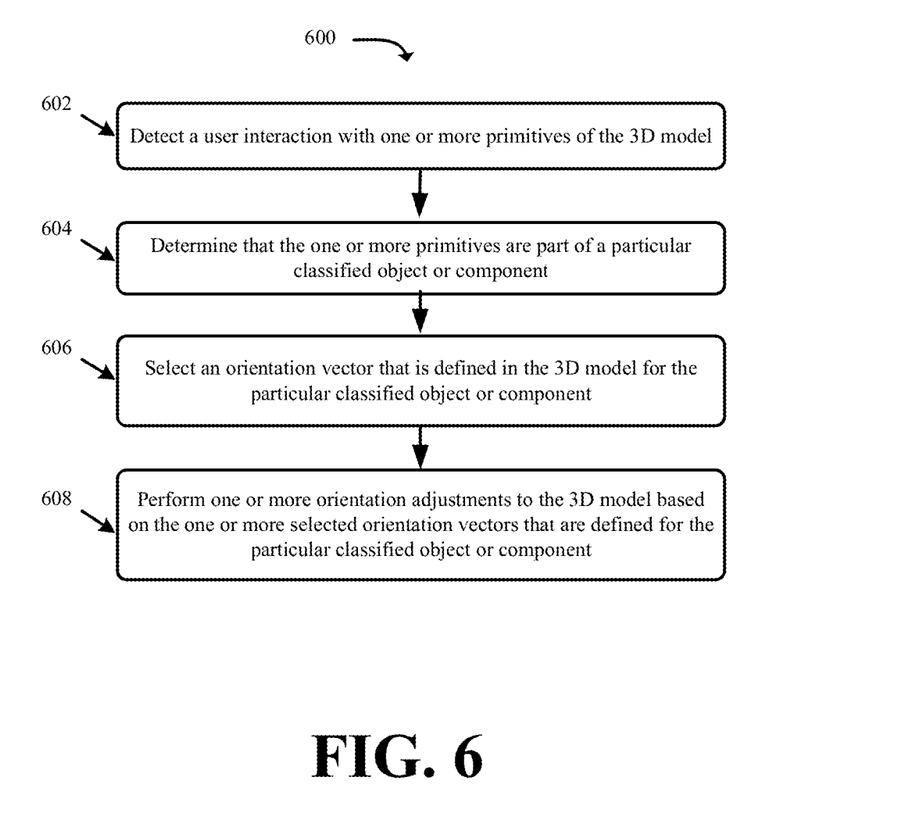
FIG. 6 presents a process for automatically orientating a 3D model according to the orientation vectors that are defined for different components of the 3D model in accordance with some embodiments presented herein.

FIG. 6 presents a process 600 for automatically orientating a 3D model according to the orientation vectors that are defined for different components of the 3D model in accordance with some embodiments presented herein. Process 600 may be implemented by 3D graphics system 100.

Process 600 includes detecting (at 602) a user interaction with one or more primitives of the 3D model. The user interaction may include input for editing, moving, or selecting the one or more primitives.

Process 600 includes determining (at 604) that the one or more primitives are part of a particular classified object or component. For instance, the one or more primitives may include metadata or a parameter with an identifier that identifies the particular classified object or component.

Process 600 includes selecting (at 606) one or more orientation vectors that are defined in the 3D model for the particular classified object or component. The orientation vectors may be defined with the same identifier as the one or more primitives. In other words, 3D graphics system 100 may search the orientation vectors of the 3D model for any that are linked to or otherwise associated with the identifier for the particular classified object or component that the user has interacted with.

Process 600 includes performing (at 608) one or more orientation adjustments to the 3D model based on the one or more selected (at 606) orientation vectors that are defined for the particular classified object or component. Performing (at 608) the orientation adjustments may include rotating, tilting, or performing different transformations of selected oriented vectors in conjunction with the 3D model primitives until each selected orientation vector is aligned relative to a different axis of the coordinate system in which the 3D model is presented or until the orientation vector is positioned with a predefined orientation or angle. Specifically, each orientation vector is defined in the 3D space of the 3D model, and adjusting the angle or positioning of the orientation vector involves applying similar transformations to the angles or positioning of the 3D model primitives.

In response to the user interacting with or selecting a primitives that is linked to or associated with different orientation vectors, 3D graphics system 100 may reorient the 3D model according to those different orientation vectors. In other words, if a user selects different objects or components in the 3D model, 3D graphics system 100 may automatically orient the 3D model to present those objects or components from different angles, perspectives, or viewpoints without the user having to manually rotate the 3D model.

Figure 7:
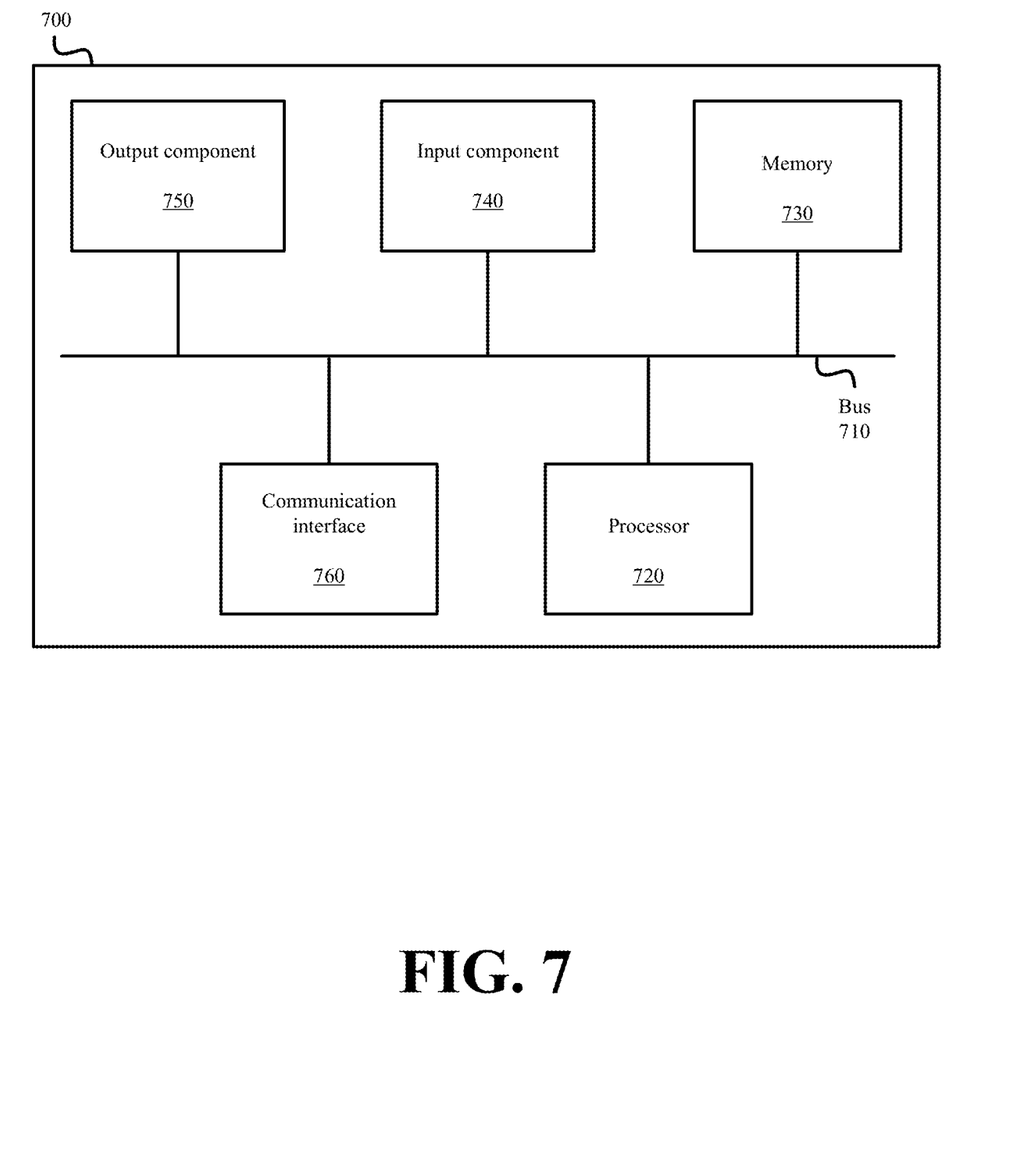
FIG. 7 illustrates example components of one or more devices, according to one or more embodiments described herein.

FIG. 7 is a diagram of example components of device 700. Device 700 may be used to implement one or more of the tools, devices, or systems described above (e.g., 3D graphics system 100). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
    receiving a three-dimensional (3D) model comprising a plurality of primitives distributed in a 3D space, wherein each primitive of the plurality of primitives corresponds to an original point, polygon, or mesh of the 3D model;
    determining a classification based on the plurality of primitives comprising one or more of a unique pattern, commonality, or feature that differentiates a particular object from a plurality of other objects;
    mapping points-of-reference associated with the classification to two or more primitives in the 3D space of the 3D model, wherein mapping the points-of-reference comprises:
        selecting a first primitive of the plurality of primitives at a position about the 3D model that corresponds to a first position of a first point-of-reference on the particular object;
        selecting a second primitive of the plurality of primitives at a different position about the 3D model that corresponds to a second position of a second point-of-reference on the particular object, wherein the first point-of-reference and the second point-of-reference on the particular object are for a first orientation vector that is used to align with a first axis of the 3D space;
        selecting a third primitive of the plurality of primitives about the 3D model that corresponds to a position of a third point-of-reference on the particular object for a second orientation vector that is used to align with a second axis of the 3D space; and
        selecting a fourth primitive of the plurality of primitives about the 3D model that corresponds to a position of a fourth point-of-reference on the particular object for the second orientation vector:
    generating the first orientation vector as a straight line connecting or passing through the first primitive and the second primitive of the 3D model that map to the first and second points-of-reference of the particular object; and adjusting an orientation with which the 3D model is presented based on an alignment of the first orientation vector with at least the first axis of the 3D space.

2. The method of claim 1, wherein adjusting the orientation comprises:
rotating the first orientation vector and the plurality of primitives until the first orientation vector is aligned with at least one axis of a coordinate space in which the 3D model is presented.

3. The method of claim 1, wherein adjusting the orientation comprises:
rotating the first orientation vector and the plurality of primitives until the first orientation vector has a particular angle in the 3D space.

4. The method of claim 1 further comprising:
retrieving the first position of the first point-of-reference that is linked to a first feature of the particular object and the second position of the second point-of-reference that is linked to a second feature of the particular object in response to determining the classification; and
determining that the position of the first primitive about the 3D model is aligned with the first position of the first point-of-reference on the particular object and that the different position of the second primitive about the 3D model is aligned with the second position of the second point-of-reference on the particular object.

5. The method of claim 1 further comprising:
setting the first primitive and the second primitive as endpoints of the first orientation vector.

6. The method of claim 1 further comprising:
rendering the plurality of primitives at offset positions resulting from adjusting the orientation, wherein said rendering generates a visualization that does not include the first orientation vector or the points-of-reference.

7. The method of claim 1 further comprising:
generating the second orientation vector based on the third primitive and the fourth primitives serving as points-of-reference associated with an orientation along the second axis.

8. The method of claim 7, wherein adjusting the orientation comprises:
performing a first orientation correction that rotates the first orientation vector and the plurality of primitives in a first direction until the first orientation vector is aligned with the first axis; and
performing a second orientation correction that rotates the second orientation vector and the plurality of primitives in a second direction until the second orientation vector is aligned with the second axis.

9. The method of claim 1, wherein generating the first orientation vector comprises:
defining the first orientation vector based on first points-of-reference associated with a first component of the particular object in the classification, and a second orientation vector based on second points-of-reference associated with a second component of the particular object in the classification.

10. The method of claim 9 further comprising:
detecting a user interaction with at least one primitive that forms part of the first component in the 3D model; and
changing an orientation of the 3D model according to the first orientation vector in response to detecting the user interaction with the at least one primitive.

11. The method of claim 10 further comprising:
detecting a user interaction with at least a different primitive that forms part of the second component in the 3D model; and
changing an orientation of the 3D model according to the second orientation vector in response to detecting the user interaction with the different primitive.

12. The method of claim 1 further comprising:
tagging the first primitive and the second primitive with an identifier that differentiates the first primitive and the second primitive from other primitives of the plurality of primitives and that identifies the first primitive and the second primitive as points-of-reference for the first orientation vector.

13. The method of claim 1,
wherein selecting the first primitive comprises defining the first primitive as a point along the first orientation vector in the 3D model and as a primitive from the plurality of primitives that does not affect a visualization of the 3D model when the plurality of primitives are rendered; and
wherein selecting the second primitive comprises defining the second primitive as another point along the first orientation vector in the 3D model and as another primitive from the plurality of primitives that does not affect the visualization of the 3D model when the plurality of primitives are rendered.

14. A three-dimensional (3D) graphics system comprising:
one or more hardware processors configured to:
receive a 3D model comprising a plurality of primitives distributed in a 3D space, wherein each primitive of the plurality of primitives corresponds to an original point, polygon, or mesh of the 3D model;
determine a classification based on the plurality of primitives comprising one or more of a unique pattern, commonality, or feature that differentiates a particular object from a plurality of other objects;
map points-of-reference associated with the classification to two or more primitives in the 3D space of the 3D model, wherein mapping the points-of-reference comprises:
selecting a first primitive of the plurality of primitives at a position about the 3D model that corresponds to a first position of a first point-of-reference on the particular object;
selecting a second primitive of the plurality of primitives at a different position about the 3D model that corresponds to a second position of a second point-of-reference on the particular object, wherein the first point-of-reference and the second point-of-reference on the particular object are for a first orientation vector that is used to align with a first axis of the 3D space;
selecting a third primitive of the plurality of primitives about the 3D model that corresponds to a position of a third point-of-reference on the particular object for a second orientation vector that is used to align with a second axis of the 3D space; and
selecting a fourth primitive of the plurality of primitives about the 3D model that corresponds to a position of a fourth point-of-reference on the particular object for the second orientation vector;
generate the first orientation vector as a straight line that connects or passes through the first primitive and the second primitive of the 3D model that map to the first and second points-of-reference of the particular object; and adjust an orientation with which the 3D model is presented based on an alignment of the first orientation vector with at least the first axis of the 3D space.

15. The 3D graphics system of claim 14, wherein adjusting the orientation comprises:

rotating the first orientation vector and the plurality of primitives until the first orientation vector is aligned with at least one axis of a coordinate space in which the 3D model is presented.

16. The 3D graphics system of claim 14, wherein adjusting the orientation comprises:

rotating the first orientation vector and the plurality of primitives until the first orientation vector has a particular angle in the 3D space.

17. The 3D graphics system of claim 14, wherein the one or more hardware processors are further configured to:

retrieve the first position of the first point-of-reference that is linked to a first feature of the particular object and the second position of the second point-of-reference that is linked to a second feature of the particular object in response to determining the classification; and determine that the position of the first primitive about the 3D model is aligned with the first position of the first point-of-reference on the particular object and that the different position of the second primitive about the 3D model is aligned with the second position of the second point-of-reference on the particular object.

18. A non-transitory computer-readable medium storing instructions that, when executed by one or more processors of a three-dimensional (3D) graphics system, cause the 3D graphics system to perform operations comprising:

receiving a 3D model comprising a plurality of primitives distributed in a 3D space, wherein each primitive of the plurality of primitives corresponds to an original point, polygon, or mesh of the 3D model;

determining a classification based on the plurality of primitives comprising one or more of a unique pattern, commonality, or feature that differentiates a particular object from a plurality of other objects;

mapping points-of-reference associated with the classification to two or more primitives in the 3D space of the 3D model, wherein mapping the points-of-reference comprises:

selecting a first primitive of the plurality of primitives at a position about the 3D model that corresponds to a first position of a first point-of-reference on the particular object; and selecting a second primitive of the plurality of primitives at a different position about the 3D model that corresponds to a second position of a second point-of-reference on the particular object, wherein the first point-of-reference and the second point-of-reference on the particular object are for a first orientation vector that is used to align with a first axis of the 3D space;

selecting a third primitive of the plurality of primitives about the 3D model that corresponds to a position of a third point-of-reference on the particular object for a second orientation vector that is used to align with a second axis of the 3D space; and selecting a fourth primitive of the plurality of primitives about the 3D model that corresponds to a position of a fourth point-of-reference on the particular object for the second orientation vector;

generating the first orientation vector as a straight line connecting or passing through the first primitive and the second primitive of the 3D model that map to the first and second points-of-reference of the particular object; and adjusting an orientation with which the 3D model is presented based on an alignment of the first orientation vector with at least the first axis of the 3D space.

* * * * *